(12) United States Patent
Williams et al.

(10) Patent No.: US 7,752,425 B2
(45) Date of Patent: Jul. 6, 2010

(54) DATA PROCESSING APPARATUS HAVING TRACE AND PREDICTION LOGIC

(75) Inventors: Michael John Williams, Ely (GB); John Michael Horley, Linton (GB); Edmond John Simon Ashfield, Cambridge (GB)

(73) Assignee: ARM Limited, Cambridge (GB)

( * ) Notice: Subject to any disclaimer, the term of this patent is extended or adjusted under 35 U.S.C. 154(b) by 700 days.

(21) Appl. No.: 11/442,594

(22) Filed: May 30, 2006

(65) Prior Publication Data

US 2007/0283133 A1 Dec. 6, 2007

(51) Int. Cl.
*G06F 9/00* (2006.01)
(52) U.S. Cl. ...................... 712/227; 717/128
(58) Field of Classification Search ............... 712/227, 712/236; 717/128
See application file for complete search history.

(56) References Cited

U.S. PATENT DOCUMENTS

| | | | | |
|---|---|---|---|---|
| 5,333,283 A * | 7/1994 | Emma et al. | .................. | 712/236 |
| 5,758,143 A * | 5/1998 | Levitan | .................. | 712/240 |
| 6,014,742 A * | 1/2000 | Krick et al. | .................. | 712/236 |
| 6,106,573 A * | 8/2000 | Mahalingaiah et al. | ...... | 717/128 |
| 6,115,810 A * | 9/2000 | Patel et al. | .................. | 712/239 |
| 6,173,395 B1 | 1/2001 | Wisor et al. | | |
| 6,233,678 B1 * | 5/2001 | Bala | .................. | 712/240 |
| 6,247,146 B1 | 6/2001 | Wheatley et al. | | |
| 6,314,530 B1 | 11/2001 | Mann | | |
| 6,513,134 B1 * | 1/2003 | Augsburg et al. | .................. | 714/38 |
| 6,647,491 B2 * | 11/2003 | Hsu et al. | .................. | 712/237 |
| 6,658,557 B1 * | 12/2003 | McCoy et al. | .................. | 712/227 |
| 2001/0032309 A1 * | 10/2001 | Henry et al. | .................. | 712/239 |
| 2002/0019930 A1 | 2/2002 | Hsu et al. | | |
| 2002/0194464 A1 * | 12/2002 | Henry et al. | .................. | 712/239 |
| 2003/0023959 A1 * | 1/2003 | Park | .................. | 717/151 |
| 2003/0051122 A1 | 3/2003 | Sato | | |
| 2003/0065912 A1 * | 4/2003 | Hum et al. | .................. | 712/239 |
| 2004/0030962 A1 | 2/2004 | Swaine et al. | | |
| 2004/0064685 A1 | 4/2004 | Nguyen et al. | | |
| 2004/0215720 A1 * | 10/2004 | Alexander et al. | .......... | 709/204 |
| 2007/0162895 A1 * | 7/2007 | Altman et al. | .............. | 717/128 |

FOREIGN PATENT DOCUMENTS

EP  0 999 498  5/2000

OTHER PUBLICATIONS

U.S. Appl. No. 11/442,593, filed May 30, 2006, Ashfield et al.
IEEE-ISTO, The Nexus 5001 Forum Standard for a Global Embedded Processor Debug Interface, Version 2.0, Dec. 2003, pp. 1-157.

* cited by examiner

*Primary Examiner*—Eddie P Chan
*Assistant Examiner*—William B Partridge
(74) *Attorney, Agent, or Firm*—Nixon & Vanderhye P.C.

(57) ABSTRACT

A data processing apparatus is disclosed comprising: trace logic for monitoring behavior of a portion of said data processing apparatus; and prediction logic operable to provide at least one prediction as to at least one step of said behavior of said portion of said data processing apparatus; wherein said trace logic is operable to: monitor behavior of said portion of said data processing apparatus; determine from said monitored behavior whether or not said at least one prediction is correct; and output a prediction indicator indicating whether or not said at least one prediction is correct.

16 Claims, 6 Drawing Sheets

| 1 | 2 | 3 | 4 | 5 | 6 | 7 | 8 |
|---|---|---|---|---|---|---|---|
| Instruction | Condition code<br>AL : always<br>EQ : only if Z=1<br>NE : only if Z=0 | Executed? | Atom - Existing scheme | Prediction | | | Atom - New scheme |
| | | | | Rule | Expected | Result | |
| *Precondition: Z flag is set (Z=1)* | | | | | | | |
| 1 | AL | Executed | E | (1) | Executed | Correct | P |
| 2 | EQ | Executed | E | (2) | Executed | Correct | P |
| 3 | EQ | Executed | E | (3a) | Executed | Correct | P |
| 4 | EQ | Executed | E | (3a) | Executed | Correct | P |
| 5 | NE | Not executed | N | (3b) | Not executed | Correct | P |
| 6 | NE | Not executed | N | (3a) | Not executed | Correct | P |
| 7 | NE | Not executed | N | (3a) | Not executed | Correct | P |
| 8 | AL | Executed | E | (1) | Executed | Correct | P |
| 9 | AL | Executed | E | (1) | Executed | Correct | P |
| 10 | NE | Not executed | N | (2) | Executed | Incorrect | M |

DATA PROCESSING APPARATUS HAVING TRACE AND PREDICTION LOGIC

BACKGROUND OF THE INVENTION

1. Field of the Invention

The field of the invention relates to data processing and in particular to diagnostic mechanisms for monitoring data processing operations.

2. Description of the Prior Art

There are a number of situations where it is desirable to keep track of what is occurring in a data processing apparatus, whether it be tracing a stream of instructions being processed, or data being manipulated, or monitoring the flow of data along a particular bus.

Tracing the activity of a data processing system whereby a trace stream is generated including data representing the step-by-step activity within the system is a highly useful tool in system development. Such tracing tools use a variety of means for tracing things such as the program flow and may include embedded trace macrocells (ETM® registered trademark of ARM Ltd.) which are present on the chip whose processing is being monitored. These are described in ARM Embedded Trace Macrocell Architecture Specification, ARM IHI 0014I of December 2002.

In addition, data processor cores increase their operating frequency and processors having multiple cores are becoming more common and pose a problem for trace. For example in existing ARM® (registered trade mark of ARM Ltd.) processor cores and ETM protocols, a bit rate of about 1.2 to 1.6 bits per instruction processed is achieved with instruction-only trace. Therefore a 1 GHz processor processing one instruction per cycle would generate 1.2 to 1.6 gigabits per second of trace data. This data may need to be taken off-chip and stored in a buffer. Furthermore, multi-processor system introduce integer multiples to this data rate.

A full-on instruction and data trace stream, which outputs on every instruction processed the full state of the processor, is becoming prohibitively expensive. Thus, existing trace macrocells remove from the full state various pieces of data that can be inferred by a decompressor. For example, the program counter (PC) is not transmitted on every instruction, since instructions are processed sequentially, and it is further not transmitted on most branch instructions, since the target of a normal branch instruction can be inferred by examining the instruction in the decompressor.

However, approx ⅓ of the remaining data produced is for "indirect branch" data. That is, instructions that branch in the instruction stream where the branch target address cannot be detected and that cannot be determined from the instruction opcode. For these instructions, a form of compression is used to reduce the number of bits that are output, for example, only the changing bits of an instruction address are output. However, experiments show that even with such compression, on average each such instruction results in approximately 14-15 bits of data output.

In summary, although compression can be used to reduce the average number of bits used to trace an individual instruction, it may be that the nature of the trace data is such that compression is not easily achieved or very effective. It would therefore be desirable to reduce the amount of trace data produced without reducing the information sent.

SUMMARY OF THE INVENTION

A first aspect of the present invention provides a data processing apparatus comprising: trace logic for monitoring behaviour of a portion of said data processing apparatus; and prediction logic operable to provide at least one prediction as to at least one step of said behaviour of said portion of said data processing apparatus; wherein said trace logic is operable to: monitor behaviour of said portion of said data processing apparatus; determine from said monitored behaviour whether or not said at least one prediction is correct; and output a prediction indicator indicating whether or not said at least one prediction is correct.

In order to address the problem of increased trace data associated with the trend to increase the operating frequency of processors and indeed the number of processors, it has been found advantageous to predict at least some of the behaviour of a portion of the data processing apparatus and to output a prediction indicator indicating whether or not the prediction is correct rather than an indicator indicating what step has actually been performed. The benefit of this prediction technique is twofold. Firstly, the symbol sending a "correct prediction indication" may be a simple Boolean or in the case of many predictions, an enumeration. This requires less data than may have had to be output to trace exactly what occurred. Secondly, if the prediction scheme makes correct predictions more often than not, the sequence of prediction outcomes may well be more compressible using simple compression techniques than the original data. Thus, the amount of trace data output can be reduced.

In some embodiments, said portion of said data processing apparatus comprises a bus, while in others it may comprise a central processing unit.

This technique can be used to monitor the behaviour of a variety of different portions of the data processing apparatus including buses and central processing units.

In some embodiments, said prediction logic is operable to predict behaviour of said central processing unit in response to a branch instruction, and said trace logic is operable to monitor said central processing unit to determine if said prediction is correct or not and to output a prediction correct indicator if said prediction is correct and an indication of where a program branched to if said prediction is incorrect.

In the case of branch instructions, it may be that a prediction of where the branch may go to can be made that may often be correct. Thus, provided the diagnostic apparatus that receives and analyses this data makes the identical prediction then in many cases it may not be necessary to output the branch destination information, an indication that the prediction is correct being sufficient. This clearly has implications in reducing the data stream. If, however, the prediction is incorrect then the actual target address that the branch instruction branched to needs to be transmitted. This can be in the form of the target address itself, or it can simply be in the form of the differences between the address of the branch instruction and the target address, or the differences between the predicted address and the target address.

In some embodiments, said branch instruction is an indirect branch instruction.

The behavior of indirect branch instructions cannot be determined from the program as such and thus in these cases predictions can be very useful. This is because as determination of what the program does in response to these instructions cannot be made from the program, in previous systems this information would need to have been sent in the trace. If, however, a prediction is made, then provided it is a good prediction and therefore often correct, the data can be significantly reduced by in many cases simply outputting a "prediction correct" indication. With direct branch instructions the destination of an instruction can be derived from the program itself and thus, predictions would only be used for these instructions where for some reason the diagnostic apparatus does not have a copy of the program or a part of the program (for example a particular subroutine). In such cases, it can be very useful to use prediction techniques for direct branches, although the prediction techniques that can be used in such situations are limited to those where the prediction does itself not rely on the diagnostic apparatus having a copy of the program, but only on information the diagnostic apparatus can infer from previous trace.

In some embodiments, said prediction logic further comprises a data store, operable to store historical data relating to previous behaviour of said portion of said data processing apparatus.

The prediction logic may find the previous behaviour of the portion of the data processing apparatus being monitored helpful when making its predictions, thus it is useful to store this information.

In some embodiments said data store comprises a stack and said historical data comprises a value indicative of an address subsequent to a branch to a subroutine instruction address, said prediction logic being operable to predict a target address of a branch from said subroutine from said stored value, said monitoring logic being operable to compare an actual target address of said branch from said subroutine with said predicted target address to determine if said prediction is correct or not.

On completing a subroutine you generally return to the instruction subsequent to the branch to subroutine instruction that called the subroutine. Because the subroutine may be called from many points in the program, the instruction that returns to the caller must be an indirect branch. Thus, information regarding where the subroutine was called from (for example, the instruction address of the branch to subroutine instruction) can be stored and used to determine a probable return address for the subroutine. Clearly at the point of branch this information is known and it is found to be convenient to place it on a stack ready for retrieval when the indirect branch back from subroutine instruction is processed. A stack is a data store comprising at least one register, data being pushed onto the top of the stack and pulled out from the top, in a last in, first out fashion.

In some embodiments, said data store comprises an associative memory and said historical data comprises a stored value indicative of an address of where a branch instruction has previously branched to, said prediction logic being operable to predict said branch instruction to subsequently branch to said address indicated by said stored value, said trace logic being operable to determine if said prediction is correct or not from a comparison of an address said branch instruction branches to and said stored value.

In the cases of some branches, it may be that historical data of where they have branched to previously can be used to predict where they may well branch to again. Thus, this information can be stored in a memory associated with the address of the branch such that it can be used to predict the address that an instruction will branch to. This branch instruction information may relate to an indirect branch but it also may relate to a direct branch where a copy of the program is not available to the diagnostic apparatus for some reason.

In some embodiments, said data processing apparatus further comprises further prediction logic, said further prediction logic being operable to provide a further prediction as to a step of said behaviour of said portion of said data processing apparatus, said trace logic being operable to determine whether or not at least one of said prediction logic or said further prediction logic has predicted said behaviour and to output a prediction indicator indicating to whether at least one of said prediction logic, or said further prediction logic has predicted said behaviour correctly.

Further prediction logic may additionally be used to predict the behaviour of a step of the data processing apparatus. The prediction logic used to predict a particular step may be selected according to the nature of the step. Having two prediction schemes may increase the likelihood of there being a correct prediction and therefore reduce the trace data stream. It should be noted that a drawback of having two schemes is that the "prediction correct" information needs to indicate which prediction logic has made the correct prediction and this may require more data to be output.

In some embodiments, said further prediction logic is operable to predict a same step of said behaviour as said prediction logic and said trace logic is operable to output an indication indicating that either said prediction logic is correct, or said further prediction logic is correct or neither is correct.

It may be that a particular prediction logic is devised for predicting certain events and as such is used exclusively for those events. In others, the further prediction logic can be used to predict the same step as the prediction logic and in this case, two prediction regimes can be used to predict, a branch instruction for example. This may increase the likelihood that one of them may be correct. Depending on the implementation, the trace logic may look at one prediction logic to see if it has correctly predicted and if it has it need not look at whether or not the other prediction logic has correctly predicted. If it has not then it looks to the further prediction logic. Indications of which prediction logic correctly predicted or that no prediction logic correctly predicted are then output.

In some embodiments, said prediction logic is operable to provide a plurality of predictions as to a corresponding plurality of steps of said behaviour of said portion of said data processing apparatus, said trace logic being operable to determine whether or not at least some of said plurality of predictions are correct and to produce a corresponding at least some of said plurality of prediction indicators said trace logic further comprising compression logic wherein said compression logic is operable to compress said at least some of said plurality of prediction indicators to produce compressed data and said trace logic is operable to output said compressed data.

Generally, the prediction logic provides a plurality of predictions corresponding to a plurality of steps of the behaviour of the portion of the data processing apparatus being monitored. The trace logic then determines whether or not they are correct and then uses compression logic to compress this information. This is advantageous if the prediction scheme is such that it can be hoped that the majority of predictions will be correct. Many well known compression techniques compress data better where data values are unevenly distributed amongst possible values than where the data values are evenly distributed amongst possible values.

In some embodiments, said portion of said data processing apparatus comprises a central processing unit and said prediction logic is operable to predict execution or non-execution of instructions, said compression logic being operable to compress indications as to whether said predictions are correct or incorrect.

For many instructions the only information that needs to be sent is whether they have executed or not. Providing a prediction as to whether an instruction executes or not, still in theory requires one of two values to be output and may thus, not seem to be worth doing. However, it may be that predictions can be made that are very good and thus, the data to be output would be nearly all "prediction correct" indications. As mentioned previously, such data is compressed well with known compression schemes. Thus, although the same amount of information needs to be output, owing to the compressible nature of this data it can be output with less data if a prediction scheme is used.

In some embodiments said prediction logic further comprises a data store, operable to store historical data relating to previous behaviour of said portion of said data processing apparatus, and wherein said trace logic is operable to periodically flush said stored historical data and to mark any prediction made therefrom as invalid, said trace logic being operable to output a "prediction invalid" indication where said trace logic determines said stored historical data to be invalid.

It should be noted that in many trace systems there is a buffer of finite size used to store the data stream output by the trace logic. As this buffer is a finite size it tends to be circular and at a certain moment some of the data is overwritten. Thus, it is important when tracing data that historical data that is needed for a prediction and is no longer available does not introduce errors into the system. For this reason, the data store storing this historical data is periodically flushed and the predictions made form this data are marked as invalid. The period of this periodic flushing can be set to be appropriate for the buffer size. These "prediction invalid" indicators can, in some embodiments, be encoded in the same way as the "prediction incorrect" indicators. This is so, for example, in cases where a correction is given along with the invalid or incorrect indicator, such as in the indirect branch examples mentioned previously, in these embodiments as the correction is given the system does not need to know whether the prediction was incorrect or invalid.

In some embodiments, said data processing apparatus further comprises a trace buffer operable to receive and store data output by said trace logic.

The trace buffer may be in some embodiments on the data processing apparatus itself or it may be outside of the data processing apparatus, in other embodiments there may not be a trace buffer as such. Reducing the amount of trace data means that the size of the trace buffer can itself be reduced; this is particularly advantageous where the trace buffer is on the data processing apparatus itself.

In some embodiments, said data processing apparatus further comprises a trace macrocell, said trace macrocell comprising said trace logic and said prediction logic.

Although the trace logic and prediction logic can be located at different parts throughout the data processing apparatus in some embodiments they are within a separate trace macrocell section.

A second aspect of the present invention provides a diagnostic apparatus operable to receive a data stream comprising prediction indicators output from a data processing apparatus, said prediction indicators indicating if predictions made by logic within said data processing apparatus about at least one step in a behavior of a portion of said data processing apparatus are correct or not, said diagnostic apparatus comprising: prediction logic operable to make predictions as to at least one step of said behavior of said portion of said data processing apparatus, said predictions corresponding to predictions made by said logic within said data processing apparatus; and decompression logic operable to determine an actual behavior of said data processing apparatus from said predictions and said received data stream.

In some embodiments, said prediction logic is operable to make at least one further prediction as to at least one further step in said behaviour of said portion of said data processing apparatus for which said data processing apparatus did not make a prediction, said decompression logic being operable to determine an actual at least one further step in said behaviour of said portion of said data processing apparatus from said data stream.

It should be noted that it not necessary for the diagnostic apparatus and the data processing apparatus to always make predictions of the same steps of the behavior of the data processing apparatus. For example, for some classes of prediction, if the diagnostic apparatus predicts a step in the behavior of the apparatus, but the prediction logic on the data processing apparatus did not make a prediction of this event; it does not matter as the data stream received by the diagnostic apparatus would contain details of the actual step that was performed, and thus, the diagnostic apparatus can discard its prediction and yet know what occurred.

In some embodiments, said diagnostic apparatus further comprises a buffer operable to receive and store said data stream, prior to forwarding it to said decompression logic.

The buffering of the data stream between the apparatus being traced and the diagnostic apparatus can be very helpful; this buffer may be located in the apparatus being traced, between the two apparatus or within the diagnostic apparatus.

Although it is not necessary for all embodiments, it is generally advantageous for the diagnostic apparatus to further comprise a data store operable to store a copy of at least part of the program being processed by said portion of said data processing apparatus.

The provision of the program within the diagnostic apparatus facilitates the tracing of the system. Without the program the system could be traced but more data would generally need to be sent between the apparatus being traced and the diagnostic apparatus.

A third aspect of the present invention provides a system of monitoring a portion of a data processing apparatus, comprising a data processing apparatus according to a first aspect of the present invention and a diagnostic apparatus according to a second aspect of the present invention.

A fourth aspect of the present invention provides a method of providing information as to a behaviour of a portion of a data processing apparatus comprising the steps of: predicting at least one step of said behaviour of said portion of said data processing apparatus; monitoring said behaviour of said portion of said data processing apparatus; determining from said monitored behaviour whether or not said at least one prediction is correct; and outputting a prediction indicator indicating whether or not said at least one prediction is correct.

A fifth aspect of the present invention provides a method of diagnosing a portion of a data processing apparatus comprising the steps of: receiving a data stream from said data processing apparatus, said data stream comprising prediction indicators, said prediction indicators indicating if predictions made by logic within said data processing apparatus about at least one step of a behaviour of a portion of said data processing apparatus are correct or not; making predictions about said at least one step of said behaviour of said portion of said data processing apparatus, said predictions corresponding to said predictions made by said logic within said data processing apparatus; and determining an actual behaviour of said data processing apparatus from said predictions made and said received data stream.

A sixth aspect of the present invention provides a computer program product which is operable when run on a data processor to control the data processor to perform the steps of the method according to a fifth aspect of the present invention.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
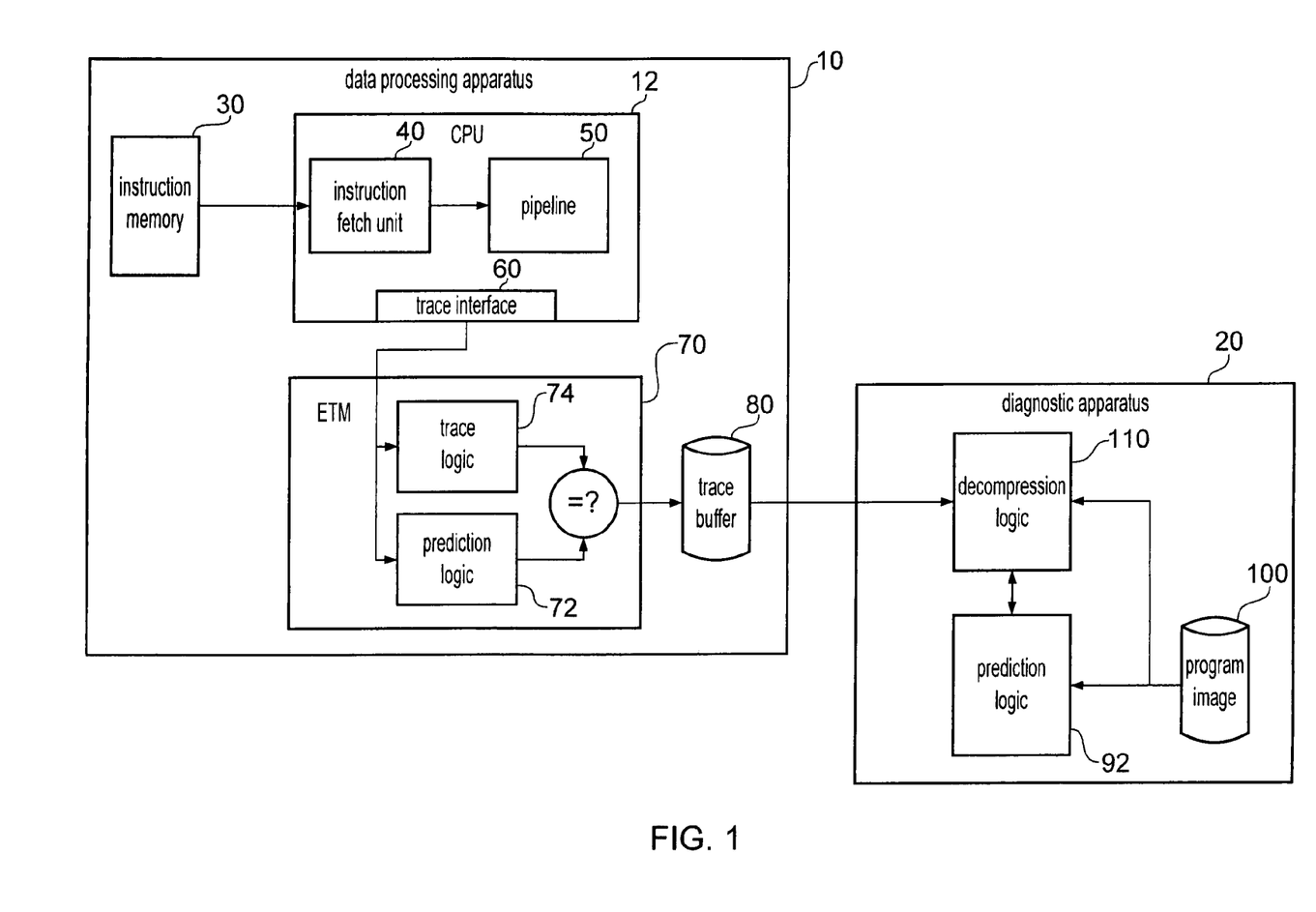
FIG. 1 schematically illustrates a trace system comprising a data processing apparatus and a diagnostic apparatus according to an embodiment of the present invention.

FIG. 1 shows a system having a data processing apparatus 10 and a diagnostic apparatus 20 according to an embodiment of the present invention. Data processing apparatus 10 contains an instruction memory 30 and a processor (CPU) 12. Processor 12 comprises an instruction fetch unit 40 which fetches instructions from the instruction memory 30. These instructions are then sent to pipeline 50.

Data processing apparatus 10 also has an Embedded Trace Macrocell (ETM) 70, this receives information about the operation of the processor 12 via trace interface 60. Embedded Trace Macrocell 70 comprises prediction logic 72 and trace logic 74. When tracing the program the prediction logic 72 predicts how it expects processor 12 to behave in response to an instruction. Trace logic 74 receives information from processor 12 via interface 60 about how the processor really did behave. This information is then compared with the predicted information and data concerning whether the prediction was correct or not is output. Depending on the implementation the "prediction correct" indicator can take a number of forms but may consist of a single bit. If the processor did not behave as predicted then further information concerning its actual behaviour needs to be output. This could simply be a "prediction incorrect" output in the case of a behavior with two possible outcomes, for example whether a conditional instruction executed or not. Where there are more possible outcomes, then further information will need to be output, for example the address of the instruction to which a branch instruction in fact branched to.

This information is output from ETM 70 and stored by trace buffer 80 which in this embodiment is on the data processing apparatus 10, but in other embodiments may be outside of it. The information is then received by the diagnostic apparatus 20.

Diagnostic apparatus 20 comprises its own prediction logic 92, an image of the program 100 being executed by processor 12 and decompression logic 110 operable to determine the behaviour of the processor that is being monitored. Prediction logic 92 has access to the image of the program 100, and, from decompression logic 110, the previous behavior of the processor 12, and hence predicts the behaviour of processor 12 in the same way as the prediction logic 72 of ETM 70. This is important because otherwise the decompression logic 110 would not be able to determine the actual behaviour of processor 12 from the trace data The trace data contains information regarding whether predictions made are correct or not, thus it is clearly important that decompression apparatus 20 makes the same predictions as are made by ETM 70 if it is to be able to use the information usefully.

Prediction logic 92 supplies these predictions to decompression logic 110.

As can be seen in this embodiment, if the predictions are correct then a simple indication that the prediction was correct needs to be output rather than information regarding the nature of the behaviour. Thus, in the case of indirect branch or conditional instructions, whose behaviour cannot be statically determined, the amount of data that needs to be transmitted between data processing apparatus 10 and decompression apparatus 20 can be reduced. This also allows the size of buffer 80 and/or the bandwidth of an off-chip interface to be reduced.

Although, in this embodiment prediction logic 74 is shown on ETM 70, it need not be present on the ETM but can rather be part of processor 12 being monitored. In this case, then the information transmitted via the trace interface 60 could also include the prediction and also whether the prediction is correct.

Figure 2A:
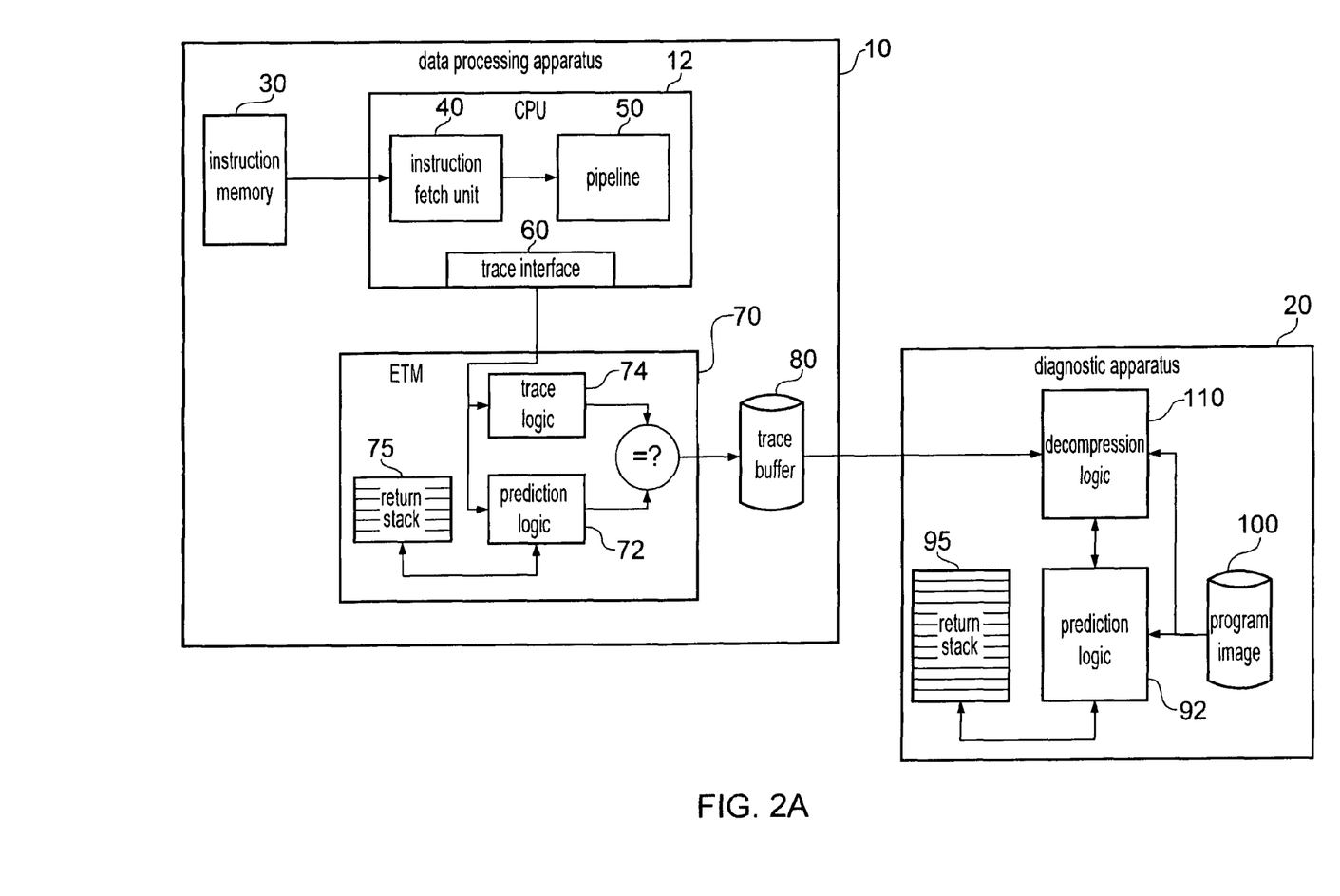
FIG. 2A schematically illustrates an embodiment of a trace system having prediction logic using historical data for its predictions according to an embodiment of the present invention.

FIG. 2A shows a system similar to FIG. 1, but having a return stack 75 in Embedded Trace Macrocell 70. This return stack 75 is operable to store the address of an instruction following a branch to subroutine instruction. This address is generally the return address from the subroutine and is thus stored as the predicted return address from that subroutine.

When tracing the program when a branch instruction possibly indicating return from a subroutine is executed by pipeline 50, the trace logic 74 receives information regarding the branch instruction's actual behaviour and compares the target address of the branch instruction with the corresponding address in return stack 75, to see if the target address is indeed the predicted return address. If the comparison shows the addresses to be the same, then the processor's behavior is as predicted, and a prediction indicator which simply indicates "prediction correct" is output, and the predicted return address is removed from the stack. Depending on the implementation this indicator can take a number of forms but may consist of a single bit. If the return address is not as predicted then an indication indicating what the return address actually was is output, and the stack is left unchanged. This may be the target address itself, or it may preferably be an indication of the differences between the address of the branch instruction and the target address.

Diagnostic apparatus 20 comprises its own prediction logic 92, its own return stack 95, a copy of the program being executed by the pipeline 100 and decompression logic 110 operable to determine the behaviour of the pipeline that is being monitored. Prediction logic 92 predicts the behaviour of program 100 in the same way as the prediction logic 72 of ETM 70. Thus, return stack 95 mirrors return stack 75.

Figure 2B:
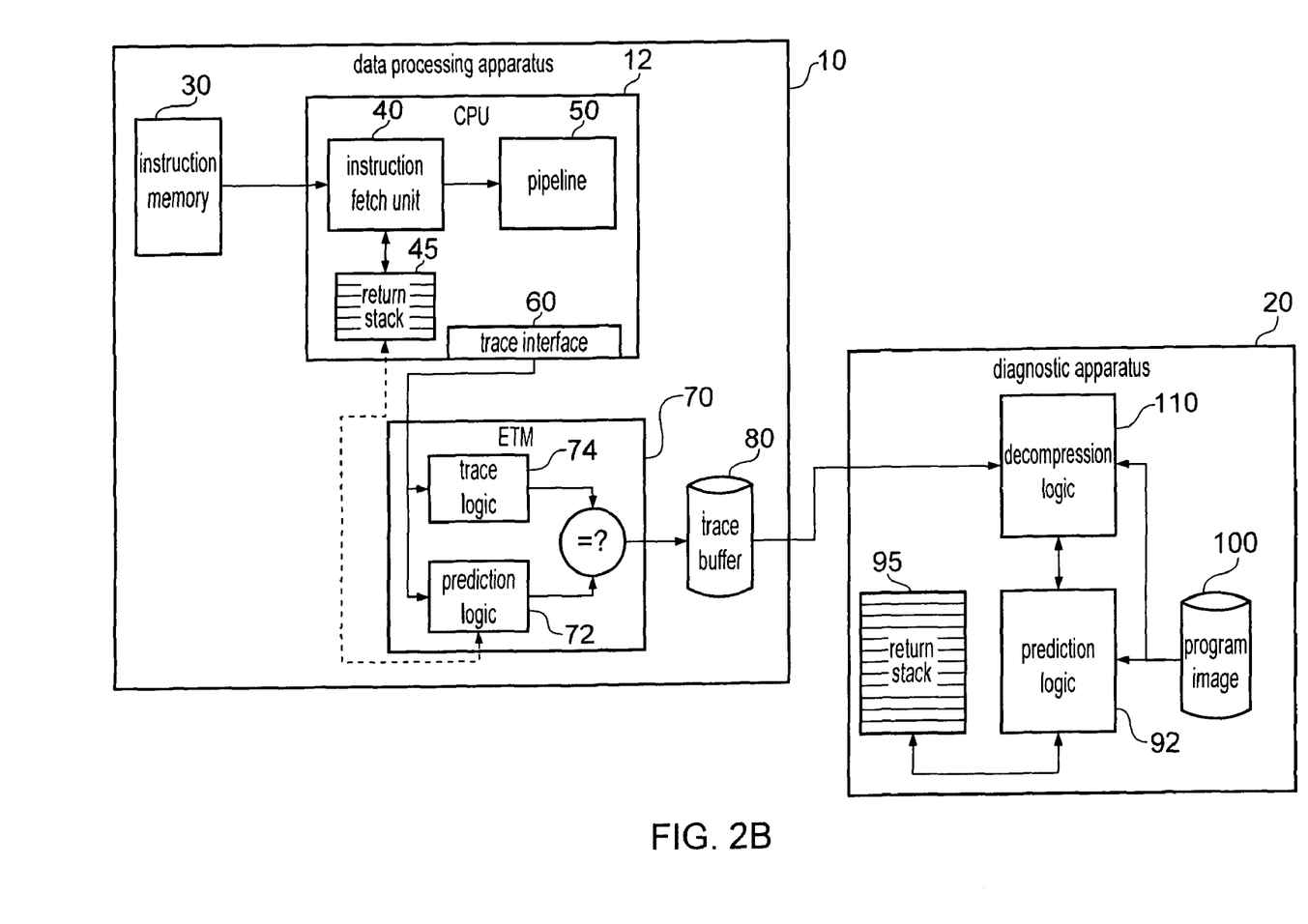
FIG. 2B schematically illustrates an alternative embodiment of a trace system having prediction logic using historical data for its predictions according to an embodiment of the present invention.

FIG. 2B shows an alternative to FIG. 2A. In this embodiment there is no stack 75 on ETM 70, as the CPU incorporates a return stack 45 operating in a similar manner. Provision is made for the ETM to access the stack 45 on the processor 12. This arrangement requires more data to be output via interface 60, but reduces the number of logic gates needed to implement the ETM as it does not need its own stack. The embodiment of the diagnostic apparatus is unchanged from FIG. 2A.

Figure 3:
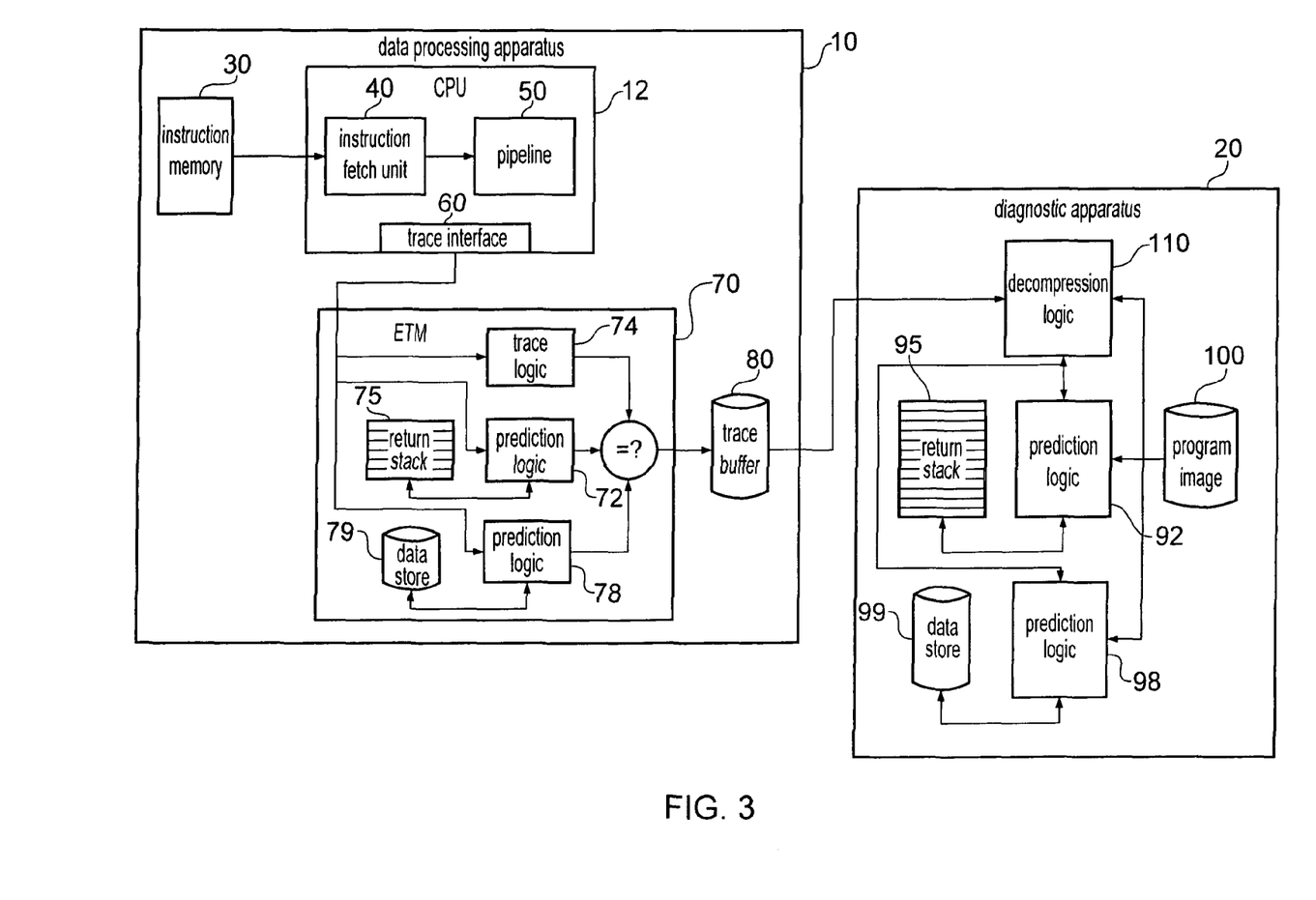
FIG. 3 schematically illustrates an embodiment of a trace system having further prediction logic using historical data for its predictions according to an embodiment of the present invention.

FIG. 3 shows a further alternative embodiment of the present invention similar to the embodiment of FIGS. 1, 2A and 2B but with additional prediction logic 78 on ETM 70 and 98 on diagnostic logic 20. It also comprises respective data stores 79 and 99 operable to store historical data relating to previous behaviour of the traced program.

This further prediction logic 78 provides a further way of predicting to which instruction a branch instruction may branch to. By having two possible predictions this allows the output to be "prediction 1 is correct", "prediction 2 is correct" or "neither is correct and this is the address you need". Thus, this increases the probability that a prediction is correct and that it is not required to pass the address. In order to enable such a setup to effectively reduce the trace data stream there clearly needs to be some way of predicting, with reasonable success, where a branch is branching to. In this embodiment the further prediction logic 78, 98 predicts where a branch branches to using historical data stored in data stores 79, 99 (respectively) relating to where that particular branch branched to previously. In other words, when this branch has been taken before, the address that it has branched to is stored and the further prediction logic predicts that it will in future branch to this address. It should be noted that this is just an example of a prediction scheme and other prediction schemes, and in particular, more complex schemes are possible. Thus, if it does branch to this predicted address a simple prediction correct is output and no explicit indication as to where it has branched to needs to be output. It should be noted that in some cases a decision might be taken by trace logic 74 to use either one or other of the prediction logics, 72, 78 depending on the nature of the instruction being traced. In other cases, it may use one first and if the prediction was not correct then it would use the other.

It should be noted that in this embodiment there is a buffer 80 placed on data processing apparatus 10 between ETM and diagnostic apparatus 20. This buffer has a finite size and in particular, if it is on the data processing apparatus 10 it is desirably quite small. It is generally a ring buffer and thus, overwrites itself. For this reason, it is important that predicted information does not require historical data that may no longer be present in the buffer. Thus, in some embodiments, the stack 75 and data store 79 are periodically flushed by marking their entries as invalid. Thus, where a prediction is marked as invalid then the ETM 70 outputs a "prediction invalid" indication, which takes the same form as a "prediction incorrect" indication, and an indication indicating what the destination address actually was. This allows the trace to function without requiring too large a trace buffer.

A summary of the operation of a specific embodiment of the present invention illustrated in FIG. 2A is given below:

whenever the processor 12 executes a branch with link (BL) instruction, this is signalled to the trace macrocell (ETM) 70;

on receipt of this instruction, the ETM determines the link return address (LR) from the current program counter (PC), and places this LR value onto stack 75. The depth of this stack is fixed, and defined by the implementation. Experiments show that very small stacks can be very effective and that there are diminishing returns for further increases in stack size. If the stack is full, the bottom entry of the stack 75 is discarded when a new entry is pushed onto the top.

Whenever the processor 12 executes an indirect branch instruction, this is also signalled to the ETM with the branch target address.

On receipt of this signal, if the ETM stack 75 is not empty, the ETM compares the branch target address with the link address at the top of its stack 75.

If the addresses match, the ETM outputs a "prediction correct" indication without additional target address information and removes the top entry from its stack 75; if the addresses do not match, or the ETM stack 75 was empty, the ETM outputs a "prediction incorrect" indication, which takes the form of an indication of the actual target address, as in the existing protocol, and leaves the stack 75 unchanged. The existing protocol encodes the indication of the target address as the differences between the target address and the address of the indirect branch instruction.

In order to decode this protocol, a debugger implements decompression logic 110. This decompression logic takes the compressed trace data stream and recreates the original executed instruction stream. Therefore, to decompress this trace, the decompression logic must:

On encountering a branch with link instruction in the decompressed trace, compute the link address and place this on a stack 95. The diagnostic apparatus 20 must implement a stack that is at least as large as the stack implemented in the ETM 70, and this size can be either fixed or dynamic. If the stack is full, then the bottom entry of the stack 95 is discarded when a new entry is pushed onto the top.

On encountering an indirect branch instruction in the decompressed trace, if the trace stream has traced this without outputting additional target address information, assume the address returned to is the current entry on the top of stack 95, and remove this entry from the stack 95. Otherwise, use the address indicated in the trace data stream, and leave the stack 95 unchanged.

(If the stack 95 in the diagnostic apparatus is larger than the stack 75 in the ETM it will make predictions where the ETM was not able to make a prediction. However, since in these cases the ETM will emit a compressed address in the trace data stream, the decompression logic's prediction will be discarded and the trace will still be correctly decompressed.)

The description of the return address stack in the ETM is very similar to a return stack in a traditional high-performance processor. Other forms and embodiments of return stacks are well known and could be applied in the present invention.

In a more complex form of an embodiment of the invention as is illustrated in FIG. 3, a full branch target cache (corresponding to data store 79) is implemented inside the ETM:

whenever the processor 12 signals to the ETM 70 that a branch has been executed, where the ETM determines that that branch is to be traced, the ETM indexes an associative memory 79 by the branch instruction address;

if an entry is found in that memory, and the entry for that address matches the branch target address, the ETM traces the instruction without outputting additional target address information;

otherwise, the ETM places the branch target address into the associative memory indexed by the branch instruction address, replacing the original entry, if there was one; creating a new entry if there was not.

The decompression logic can maintain in data store 99, from reference to its own decompressed trace output, a complete branch history of the program execution, and therefore, when it encounters a branch instruction traced without outputting additional target address information, prediction logic 98 can determine to where the instruction previously branched to, and hence recover the eliminated data.

The decompression logic can also deduce, from reference to the trace stream, the location of all indirect branch instructions in the program, as these are always traced at least once. Accordingly, the branch target cache prediction scheme can also be adapted for use in a operational mode where the decompression logic 110 does not have access to copy of the program 100, and the ETM traces all direct branches in the same manner as indirect branches, with prediction logic 78 also making predictions as to direct branches.

The associative memory 79 is of a fixed size, and may be split into banks, indexed on some part of the branch instruction address. Such constructs are well known. Where an entry is allocated in the associative memory, a previous entry is evicted from the memory. Various eviction schemes are possible and are well known.

The description of the branch target cache in the ETM is very similar to a branch target cache in a traditional high-performance processor. Other forms and embodiments of branch target cache are well known and could equally be applied in the present invention.

As noted above, the return address stack and the branch target cache in the ETM have fixed sizes. As items are pushed onto the stack, items at the bottom of the stack are discarded, and as entries are allocated in the cache, previous entries are discarded.

Because trace data is usually stored in a circular buffer where new data overwrites old data, there is also a possibility that the return address on the stack, or a branch target address in the branch target cache was allocated sufficiently long in the past that the decompression logic is unable to recover this data from earlier in the data stream.

For this reason, the ETM must periodically flush its return address stack 75 and branch target cache 79, setting all entries to invalid. The ETM already includes similar notions of flushing compressor state periodically.

Experiments show that the return address stack provides most of the benefit of a full branch target cache for the case where only indirect branches are being traced by the ETM, but can be implemented with far fewer logic gates. However, where all branches are traced by the ETM, the full branch target cache gives markedly better results.

The embodiments of FIGS. 2A, 2B and 3 dealt explicitly with branches. It will be appreciated that other schemes for predicting the destination of branch instructions in processors are well known and can also be adapted for use when tracing branches.

A further example of the use of prediction could be in tracing instructions where it may be possible simply by predicting whether instructions will be executed or not to reduce the amount of data that needs to be sent in the trace data stream.

Instructions processed by existing ARM processor cores may be conditional on some part of the state of the processor, and hence only execute if that state has a particular value or values. Such instructions include a wide range of operations, and not just branch instructions. Therefore for tracing such a processor, the ETM must emit indications of whether instructions other than branch instructions were executed or not. Although the majority of instructions processed tend not to be such conditional instructions, of those which are conditional experimentation has shown that the distribution of executed and not executed instructions is approximately equal, leading to a data stream which does not compress well.

Figure 4:
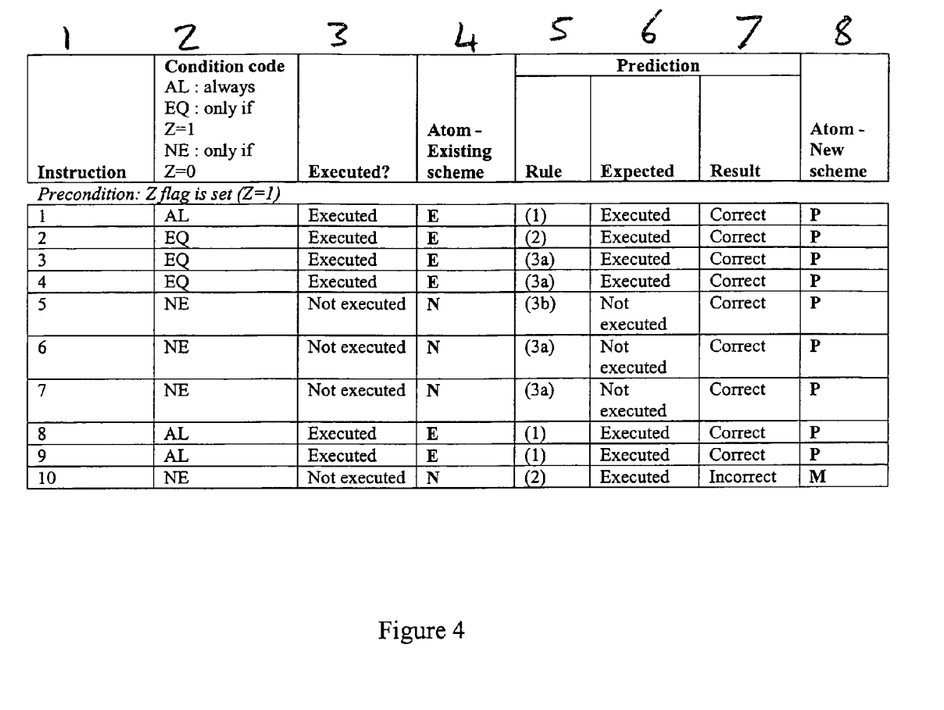
FIG. 4 shows a table indicating a list of instructions and how an existing scheme would encode their execution in trace and how a scheme according to an embodiment of the present invention can indicate how they are executed.

FIG. 4 shows a table indicating the conditions of a list of instructions and how an existing scheme would encode their execution in trace and how a scheme according to an embodiment of the present invention can indicate how they are executed.

In the embodiment of FIG. 4 an example prediction scheme is used. Clearly different prediction schemes could be used depending on circumstances.

The example prediction scheme used has the following rules:
1. If the instruction is unconditional (AL), predict it is executed.
2. When a conditional instruction follows an unconditional instruction, predict it is executed.
3. When a second conditional instruction follows a first conditional instruction:
    a. if the second instruction's condition is the same as the first instruction's condition, then predict that the execution status of the second instruction will be the same as the actual execution status of the first instruction; whereas
    b. if the second instruction's condition is different from the first instruction's condition, then predict that the execution status of the second instruction will be the opposite of the actual execution status of the first instruction.

FIG. 4 shows a sequence of ten ARM instructions and demonstrates this example prediction scheme and its benefits over the existing encoding scheme.

FIG. 4, column 1 indicates the order in which the instructions executed.

FIG. 4, column 2 indicates the condition code of the instruction, being one of the three condition codes listed, indicating whether an instruction is unconditional (always executed), or else conditional on the state of the processor's Z flag.

FIG. 4, column 3 indicates whether the instruction was in fact executed or not.

FIG. 4, column 4 shows how an existing trace scheme would output the information regarding the execution or non-execution of the instructions. Under the existing scheme each instruction processed causes either an E-atom, being an indication that the instruction executed, or an N-atom, being an indication that the instruction was not executed, to be output; said atoms then forming a data stream which is then subject to further compression.

FIG. 4, columns 5 through to 7 describe the behavior of the prediction scheme described above, with column 5 indicating which compression rule applies, column 6 giving the result of the prediction, and column 7 indicating whether that prediction was correct.

FIG. 4, column 8, the final column, shows the output of trace logic according to an embodiment of the present invention. As in the existing scheme, each instruction processed causes either a P-atom, being an indication of the prediction was correct, or an M-atom, being an indication that the prediction was incorrect, to be output; said atoms then forming a data stream which is then subject to further compression.

This simple example demonstrates that using the existing encoding, 4 E-atoms are output, followed by 3 N-atoms, 2 E-atoms and one final N-atom. Thus, the number of N and E-atoms are about equal. The prediction-based scheme outputs 9 P-atoms, and 1 M-atom. Biasing the encoding stream towards one encoding (in this case P-atoms), allows much better run-length encoding compression of the trace stream. Thus, provided the prediction scheme generally provides good predictions a trace stream is produced which can be very effectively compressed.

It will be appreciated that other instruction prediction schemes are well known in processors and can be applied in generating the P and M-atom encodings.

Thus, in this embodiment it is simply the ability to compress the predicted data more effectively that reduces the data stream, not the reduction in the amount of information sent.

Figure 5:
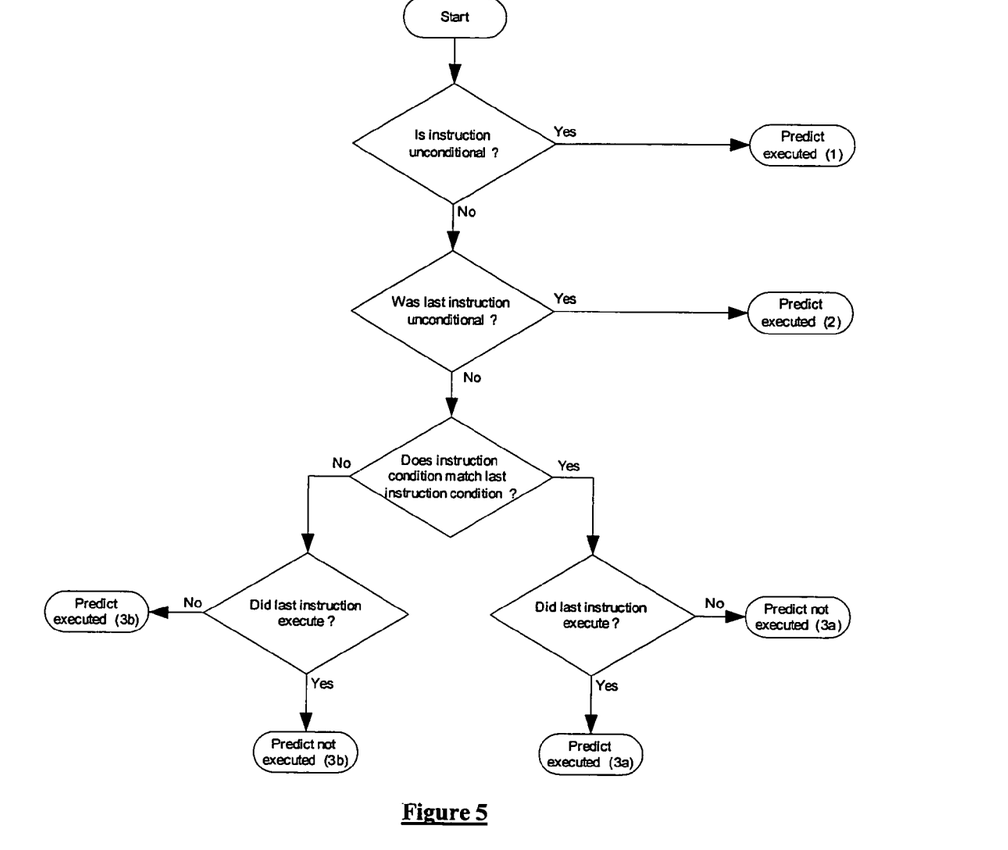
FIG. 5 shows a flow diagram illustrating the steps performed in a prediction algorithm used in the generation of the trace atoms shown in FIG. 4.

FIG. 5 shows a flow diagram illustrating a prediction scheme following the same prediction rules as are followed in FIG. 4. In this prediction scheme an instruction is considered and if it is unconditional an "executed" prediction is made in accordance with rule 1 (see above). If it is not unconditional, the previous instruction is considered to see if it was unconditional if it was, then an "executed" prediction is made (rule 2). If it was not, the instruction condition is considered to see if it matches the previous instruction condition, if it does, then if the previous instruction executed "executed" is predicted, whereas if it did not execute "not executed" is predicted in accordance with rule 3a. If the instruction condition did not match the previous instruction condition, then if the previous instruction executed "not executed" is predicted whereas if it did not execute, "executed" is predicted (rule 3b).

The embodiments shown previously all relate to the tracing of processors. As will be readily appreciated the prediction scheme can equally well be used to reduce the trace data stream generated during the trace of different parts of the data processing apparatus, such as tracing the activity on a bus.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
a processor; and
a trace macrocell comprising:
trace logic for monitoring behavior of a portion of said data processing apparatus; and
prediction logic configured to provide at least one prediction as to at least one step of said behavior of said portion of said data processing apparatus; wherein
said trace logic is configured to:
monitor behavior of said portion of said data processing apparatus;
determine from said monitored behavior whether or not said at least one prediction is correct; and
output trace data at a trace data output where said trace data for said at least one predicted step consists of at least one prediction correct indicator if said at least one prediction is correct and includes a prediction incorrect indicator if said at least one prediction is incorrect.

2. A data processing apparatus according to claim 1, wherein said portion of said data processing apparatus comprises a bus.

3. A data processing apparatus according to claim 1, wherein said portion of said data processing apparatus comprises a central processing unit.

4. A data processing apparatus comprising:
a processor; and
a trace macrocell comprising:
trace logic for monitoring behavior of a portion of said data processing apparatus; and
prediction logic configured to provide at least one prediction as to at least one step of said behavior of said portion of said data processing apparatus; wherein
said trace logic is configured to:
monitor behavior of said portion of said data processing apparatus;
determine from said monitored behavior whether or not said at least one prediction is correct; and
output trace data including a prediction indicator indicating whether or not said at least one prediction is correct and providing a trace data output,
wherein said prediction logic is configured to predict behavior of said central processing unit in response to a branch instruction, and said trace logic is configured to monitor said central processing unit to determine if said prediction is correct or not and to output trace data, said trace data consisting of a prediction correct indicator if said prediction is correct and an indication of where a program branched to if said prediction is incorrect.

5. A data processing apparatus according to claim 4, wherein said branch instruction is an indirect branch instruction.

6. A data processing apparatus according to claim 4, said prediction logic further comprising a data store, configured to store historical data relating to previous behavior of said portion of said data processing apparatus.

7. A data processing apparatus according to claim 6, wherein said data store comprises a stack and said historical data comprises a value indicative of an address subsequent to a branch to a subroutine instruction address, said prediction logic configured to predict a target address of a branch from said subroutine from said stored value, said monitoring logic configured to compare an actual target address of said branch from said subroutine with said predicted target address to determine if said prediction is correct or not.

8. A data processing apparatus according to claim 6, wherein said data store comprises an associative memory and said historical data comprises a stored value indicative of an address of where a branch instruction has previously branched to, said prediction logic configured to predict said branch instruction to subsequently branch to said address indicated by said stored value, said trace logic configured to determine if said prediction is correct or not from a comparison of an address said branch instruction branches to and said stored value.

9. A data processing apparatus according to claim 1, comprising further prediction logic, said further prediction logic configured to provide a further prediction as to a step of said behavior of said portion of said data processing apparatus, said trace logic configured to determine whether or not at least one of said prediction logic or said further prediction logic has predicted said behavior and to output a prediction indicator indicating whether or not at least one of said prediction logic, or said further prediction logic has predicted said behavior correctly.

10. A data processing apparatus according to claim 9, wherein said further prediction logic is configured to predict a same step of said behavior as said prediction logic and said trace logic is configured to output an indication indicating that either said prediction logic is correct, or said further prediction logic is correct or neither is correct.

11. A data processing apparatus according to claim 1, said prediction logic configured to provide a plurality of predictions as to a corresponding plurality of steps of said behavior of said portion of said data processing apparatus, said trace logic configured to determine whether or not at least some of said plurality of predictions are correct or not and to produce a corresponding at least some of said plurality of prediction indicators said trace logic further comprising compression logic wherein said compression logic is configured to compress said at least some of said plurality of prediction indicators to produce compressed data and said trace logic is configured to output said compressed data.

12. A data processing apparatus according to claim 11, wherein said portion of said data processing apparatus comprises a central processing unit and said prediction logic is configured to predict execution or non-execution of instructions, said compression logic is configured to compress indications as to whether said predictions are correct or incorrect.

13. A data processing apparatus according to claim 1, said prediction logic further comprising a data store, configured to store historical data relating to previous behavior of said portion of said data processing apparatus, and wherein said trace logic is configured to periodically flush said stored historical data and to mark any prediction made therefrom as invalid, said trace logic is configured to output a prediction invalid indication where said trace logic determines said stored historical data to be invalid.

14. A data processing apparatus according to claim 1, said data processing apparatus further comprising a trace buffer configured to receive and store data output by said trace logic and to output said trace data output.

15. A data processing apparatus according to claim 1, said data processing apparatus further comprising a trace macrocell, said trace macrocell comprising said trace logic and said prediction logic.

16. A method of providing information as to a behavior of a portion of a data processing apparatus, the data processing apparatus comprising a processor, comprising the steps of:
predicting at least one step of said behavior of said portion of said data processing apparatus;
tracing said behavior of said portion of said data processing apparatus;
determining from said monitored behavior whether or not said at least one prediction is correct; and
outputting, from said data processing apparatus, trace data, where said trace data for said at least one predicted step consists of at least one prediction correct indicator if said at least one prediction is correct and includes a prediction incorrect indicator if said at least one prediction is incorrect.

* * * * *